United States Patent Office 3,252,998
Patented May 24, 1966

3,252,998
CYCLIC 5- AND 6-MEMBERED ETHERS
Günther Ohloff, Erich Klein, and Gerhard Schade, Mulheim (Ruhr), Germany, assignors to Studiengesellschaft m.b.H., Mulheim (Ruhr), Germany
No Drawing. Filed May 10, 1962, Ser. No. 193,856
Claims priority, application Germany, May 18, 1961, St 17,836
9 Claims. (Cl. 260—345.1)

This invention is concerned with a process for the preparation of cyclic ethers. Substituted cyclic ethers from the class of tetrahydrofurans and tetrahydropyrans having the basic skeleton of the terpene series are known to be constituents of essential oils. They play a vital part in the production of the characteristic odor of such a mixture of substances. Thus, for example, optically active 4-methyl-2-[2'-methylpropen-(1')-yl] tetrahydropyran, known as "rose oxide," has been discovered in Bulgarian rose oil which is very costly. However, no productive method of synthesising rose oxide or other similar compounds from the class of pyrans or furans, whether hydrated or not, is as yet known. Such a method of synthesis would be of considerable economic and technical interest, because the synthetic perfume mixtures at present known in this field do not by far attain the quality of natural rose oil.

The object of the present invention is to provide a simple means of producing the described rose oxide and similar compounds, which must be assumed to have valuable properties, more especially as perfumes. The invention thus embraces the production of known and novel substances from the class of 5- and 6-membered cyclic ethers having the basic terpene structure.

The invention relates to a process for the production of cyclic 5- or 6-membered ethers by intramolecular splitting-off of water from dihydroxy compounds with ring closure, which is characterized in that 3,4-ethylenically unsaturated acyclic terpenes which have a hydroxyl or perhydroxyl group in the 2-position, a hydroxyl group or an enolisable keto group in the 8- or 7-position and if desired further double bonds, with the basic hydrocarbon structure

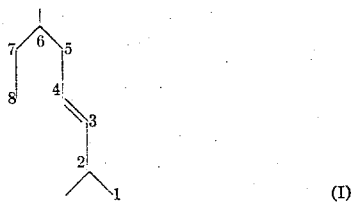

are dehydrated under cyclizing conditions with displacement of the allyl of the double bond from the 3-position into the 2-position.

As starting materials for the process of the invention diols of the following general structural formula:

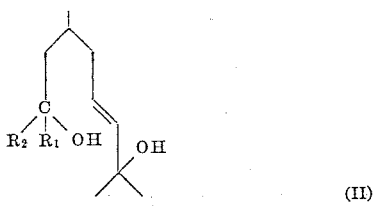

in which a perhydroxyl group may be present at the $C_2$ instead of the hydroxyl group may, for example, be used.

It will be readily apparent that cyclic ethers cannot be obtained from the dihydroxyl compounds employed in accordance with the invention, for example from the diols of the general Formula II, simply by splitting-off water, but that a transposition in the structure of the dihydroxyl compound must first of all be effected. It is assumed that this transposition involves a displacement of the allyl of the double bond between the C-atoms 3 and 4 into the 2,3-position and the formation of a dihydroxyl compound in which one HO group is present in the 4-position of the terpene skeleton of the general Formula I. It can then here react with the second OH group to form the cyclic ether, with removal of water. The reaction stages occurring in the process according to the invention have not been fully explained. It has been established however that cyclic ethers can surprisingly be obtained from the compounds of the type of the general Formula I and that these ethers can only be theoretically derived on the basis of multiple transpositions in the molecular structure of the starting material.

The course of the reaction here described, which is represented as comprising two stages in the theoretical explanation, but can in practice be carried out in a single process stage, is surprising in its practical applicability. The process according to the invention must necessarily take place under conditions which lead to a dehydration of the acyclic terpene employed. At least the OH group present in the 2-position of the starting material is attached to a tertiary C-atom. It is known that such tertiary alkanols lose water with particular readiness with the formation of the corresponding olefine. If such a splitting-off of water immediately occurred in the starting materials employed in accordance with the invention a butadiene-like compound would be formed and not a cyclic compound as results by the process of the invention. The fact that cyclic ethers result from the process according to the invention is therefore surprising.

The reaction principle described with reference to the compounds of the general Formula II is not peculiar to this specific compound. It occurs with all compounds conforming to the definition of the general basic structure of Formula I.

Instead of the diol of the general Formula II, therefore, there may be employed, for example, the carbonyl compound having the following general Formula III:

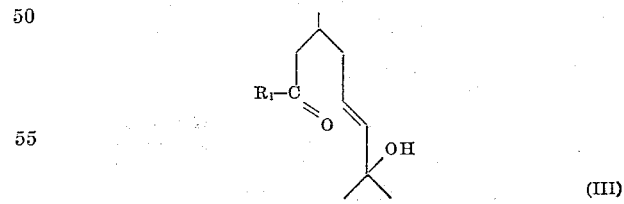

An essential factor here is that the carbonyl grouping in the 8-position is capable of existing in enol form. The cyclization of such a dihydroxyl compound then proceeds also by way of a transposition mechanism, which is probably complex, to the corresponding cyclic ethers, which now merely possess one double bond more than, for example, the ethers obtained by cyclization of the diols of the general Formula II.

The transposition principle according to the invention also includes corresponding acyclic terpenes which have more than one double bond in the carbon skeleton. An example of this is the class of compounds of the general Formula IV.

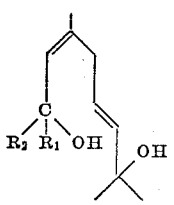

(IV)

In the dehyrating cyclization of these starting compounds, the same allyl displacement initially occurs as an intermediate stage and is succeeded by the splitting-off of water between the two hydroxyl groups. In this case, a dihydropyran derivative is formed.

If there is employed as starting material the carbonyl compound V shown below, which corresponds to the dihydroxy compound IV, in the same way as the carbonyl compound III corresponds to the diol compound II, the reaction product having a corresponding number of unsaturated bonds is obtained with the intermediate formation of the intermediate reaction stages described therein.

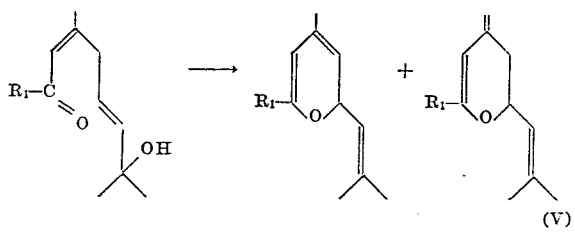

(V)

In all the specific embodiments of the invention shown above, acyclic terpenes are employed, which contain the second oxygen function on the $C_8$-carbon atom. In all these cases, pyran or hydropyran derivatives are obtained. If, in accordance with the invention acyclic terpenes are employed instead, which contain the second oxygen function in the $C_7$ position, furan derivatives are obtained, for example in accordance with the following reaction scheme

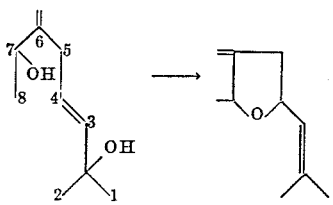

(VI)

In the general formulae given in the foregoing, the residues $R_1$ and $R_2$ may be identical or different residues. These may represent in particular hydrogen or hydrocarbon residues, the hydrocarbon residues preferably being alkyl residues, which may also be unsaturated. In the case of the alkyl residues, those having up to 6 C-atoms are preferred. Since the perfume properties of the products according to the invention decrease with an excessively high carbon number, it is especially preferred so to choose the residues $R_1$ and $R_2$ that a carbon skeleton having at most about 18 C-atoms in all is obtained.

If the acyclic starting compounds contain additional double bonds, especially in the 6-position, as is shown, for example, in Formulae IV and V, it may be necessary to use particular stereoisomers for the ring closure reaction. The cyclizing dehydration can be effected only with a diene derivative whose double bond occupies the cis-position in the 6-position. The stereochemistry of the double bond in the 3-position is unimportant. The reaction product according to the invention is not directly derived from the corresponding diene derivative with the trans-position of the double bond in the 6-position. A normal isomerization of the cis-position must therefore in this case first be carried out in order that the reaction according to the invention may also occur in that part of the starting material whose $C_6$-double bond was originally in the trans-position.

By reason of their constitution, the products according to the invention have a number of possibilities of forming stereoisomers and their enantiomeric forms and the corresponding racemates. In the cyclization of the compounds of the type of the general Formula II, for example, reaction products are obtained which may have two stereoisomers, four optical isomers and two racemates. Since the cyclization carried out in accordance with the invention can take place under extremely mild process conditions, it is possible to cyclize optically active starting substances in such manner as to maintain their optical activity. If, for example, optically active glycol or an optically active glycol mixture is employed as starting material, an optically active oxide mixture is obtained. The amount of the activity depends on the constitution of the starting material. The isomeric mixtures produced may be separated into the individual isomers by methods known per se, for example fractional distillation. An important new possibility of employing the products obtained in accordance with the invention is thus opened up, since it has been established that the various stereoisomers and enantiomeric forms have specific important perfume properties by virtue of which it may be desirable to isolate particular isomers. The process according to the invention makes this possible. The synthesis may if desired therefore be so carried out by suitable control of the reaction to lead directly to particular stereoisomers. Examples of this will be given hereinafter.

The ring closure reaction may be carried out in various ways. For example, a thermal ring-closing reaction is possible. Preferably, the acyclic starting compound is in this case heated to temperatures above 150° C., optionally in vacuo. The water split off is preferably distilled off from the reaction mixture. This reaction may be accelerated by applying the acyclic starting product to a surface heated to a relatively high temperature, more especially in vacuo, so that the thermal treatment of the starting material may be completed in a short time. Thus, for example, an acyclic glycol employed in accordance with the invention may be introduced drop-by-drop into a reaction vessel preheated to 200–250° C. and the cyclization mixture formed may be continuously distilled. In practice, a simple distillation of the dihydroxyl compound gives the desired cyclization product as distillate, for example with a bath temperature of about 150° C.

The ring-closing reaction according to the invention is substantially accelerated by the use of acid catalysts. The cyclizing reaction proceeds, for example, spontaneously even in the cold if an acyclic glycol employed in accordance with the invention is stirred or shaken, for example, with a 30% aqueous sulphuric acid solution. It is thus possible by this use of acid catalysts to carry out the cyclization under particularly moderate conditions, which may be important for the aforesaid production of specific isomers. The effects of heat and an acid catalyst may be combined by heating the starting material in the presence of small quantities of acid catalyst. In this case, it is in general unnecessary to adjust the temperature to such high ranges as are desirable in the absence of acid catalysts. For example, if the operation is carried out in the presence of toluene-p-sulphonic acid as a catalyst, a maximum temperature of about 80° C. need not be exceeded. The cyclization product obtained may then be distilled off in vacuo. There may be employed as acid catalysts any compounds usually employed for this purpose. Typical examples are organic acids, inorganic acids, mixed organic and inorganic acids, such as aromatic sulphonic acids, Lewis acids, acid salts and the like. In some cases, it may be desirable to carry out the cyclization by treatment with steam, if desired in the presence of acid catalysts. If, for example, an acyclic glycol is treated in accordance with the invention with steam in the presence of a saturated oxalic acid solution, the mixture of the various isomeric products according to the invention is obtained in highly pure form. This steam treatment is particularly desirable in the case of a starting material having a perhydroxyl group in the 2-position. If such an acyclic terpene is treated with steam, the cyclic ether according to the invention is directly produced, for example in a 25% yield. In this treatment, a decomposition of the perhydroxyl group obviously occurs. The chemical reactions occurring have not been fully explained. A particular aspect of the process resides in the ring-closing reaction of acyclic terpenes which comprise an enolisable carbonyl group in the 7- or 8-position. In this case it is necessary to use such reaction conditions that the water formed in the ring-closing reaction is removed from the equilibrium. This is possible in various ways. The simplest way is to remove the said reaction water by distillation. In this case, heating is then carried out in the presence of a preferably strongly acid catalyst, for example toluene-p-sulphonic acid, the reaction water formed first being distilled off and then the cyclic ether formed. In another procedure, the equilibrium may be influenced by adding water-extracting media. Examples of this are the known water-extracting media such as zinc chloride, phosphorus pentoxide and the like.

In general it is not necessary in accordance with the invention to employ pure starting materials. The cyclizing reaction may also be carried out with mixtures which contain cyclizable and related but non-cyclizable compounds. There are then formed in the process of the invention, in addition to the unmodified, non-cyclizable compounds, cyclic ethers which can be readily separated by distillation from the starting materials uninfluenced by the cyclization. This separation may be effected, for example, by simple distillation or by way of the formation of complexes of the cyclic compounds, for example with ferrocyanic acid. In all cases, the oxide formation takes place quantitatively, it being possible to obtain the individual isomers directly with a purity of, for example, 99% without further purification.

Particularly suitable starting materials according to the invention are the oxidation mixtures which have been produced by the process of German Auslegeschrift No. 1,137,730 [Process for the Production of Oxidation Products From Unsaturated Compounds] by photo-sensitized oxidation of acyclic terpenes. These acyclic terpenes are characterized by the fact that they contain before the photo-oxidation, in addition to at least one C—C double bond, an oxygen-containing group, more especially a hydroxyl, aldehyde or keto group, so that after the oxidation and, where necessary, after a subsequent partial reduction of the first-formed perhydroxyl group, acyclic terpenes having two oxygen functions are produced, which may be employed in the process according to the present invention. The preparation of numerous starting compounds suitable for the process of the invention has been described in detail in the aforesaid prior patent, which further shows that in the photo-sensitized oxidation reaction mixtures are formed which satisfy the conditions of the starting compounds of the present invention only in some of their reaction products. If, for example, citronellol is subjected to the photo-oxidation process according to prior patent, a mixture of 60% of 2,6-dimethyl-2,8-dihydroxyoct-1-ene and 40% of 2,6-dimethyl-3,8-dihydroxyoct-1-ene is obtained. Of this, only the 60% of the reaction products are suitable for the process of the invention which contain one hydroxyl group in the 2-position. In accordance with the embodiment of the invention already mentioned, it is possible, without isolating this one reaction product, to subject the entire reaction mixture obtained by the process of the prior patent to the process of the invention. Only the aforesaid 60% are then subjected to the cyclization.

The ether formed may readily be separated from the unmodified 2,6-dimethyl-3,8-dihydroxyoct-1-ene. Other methods of producing starting mixtures for the process of the invention are the reduction of the photo-oxidation products of acetoxycitronellol, citronellal and citronellic acid or their intramolecular esters, for example by LiAlH$_4$.

If nerol is employed as starting material in the process of the prior patent instead of citronellol, there is obtained after the subsequent reduction a reaction mixture which supplies on cyclization in the process according to the invention derivatives of $\Delta^4$-dihydropyran. Here again, it is possible to start directly with the reaction mixture obtained by the process of the prior patent, which contains 60% of cyclizable reaction constituents and about 40% of non-cyclizable reaction constituents. Other methods of producing such mixtures of materials as starting products for the process of the invention are again photo-oxidation and subsequent reduction, for example of veryl acetate, neryl and cis-geranic acid of their intramolecular esters, for example by LiAlH$_4$ in accordance with the aforesaid prior patent. It has already been pointed out that parts of the starting material which contain the 6-double bond in the trans-position are first transposed into the corresponding cis-compound before being subjected to the cyclization according to the invention.

It is also true of the hydroxyaldehydes and hydroxyketones to be employed in the process of the invention that mixtures of cylizable and non-cyclizable compounds may be subjected to the process. Thus, the process is simplified if the 2,6-dimethyl-3-oct-8-enal-2-ol obtained in 60% yield of the photo-oxidation of β-citronellal in addition to 2,6-dimethyl-1-oct-8-enal-3-ol (40%) by the process of the prior patent is employed in its mixture, in which case only the 2,6-dimethyl-3-oct-8-enal-2-ol changes over into the cyclic ether in high yield. The resulting $\Delta^7$-dihydropyrans possess—in the same way as the compounds hitherto mentioned—excellent perfume properties. It has been surprisingly found that in the cyclization with toluene-p-sulphonic acid as catalyst the ring closure takes place stereospecifically, while under the action of oxalic acid the reaction proceeds with the formation of the two possible stereoisomers.

Typical reaction schemes according to the invention and typical starting materials and end products of the process of the invention are given below.

SCHEME A

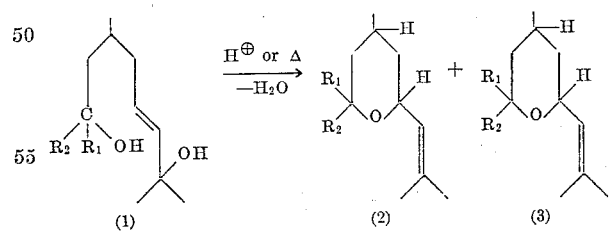

For example:
(a) 2,6-dimethyl-3-octene-2,8-diol
  $R_1 + R_2 = H$
(b) 2,6-dimethyl-3-nonene-2,8-diol
  $R_1 = CH_3$; $R_2 + H$
(c) 2,6,8-trimethyl-3-nonene-2,8-diol
  $R_1 + R_2 = =CH_3$
(d) 2,6-dimethyl-3,9-decadiene-2,8-diol
  $R_1 = -CH=CH_2$; $R_2 = H$
(e) 2,6,11-trimethyl-3,11-duodecadiene-2,8-diol

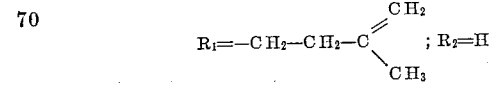

(a) 4-methyl-2-[2'-methylpropene-(1')-yl]-tetrahydropyran: $R_1 + R_2 = H$ (b) 4,6-dimethyl-2-[2'-methylpropene-(1')-yl]-tetrahydropyran: $R_1=CH_3$; $R_2=H$
(c) 4,6,6-trimethyl-2-[2'-methylpropene-(1')-yl]-tetrahydropyran: $R_1+R_2=-CH_3$
(d) 4-methyl-6-vinyl-2-[2'-methylpropene-(1')-yl]-tetrahydropyran: $R_1=-CH=CH_2$; $R_2=H$
(e) 4-methyl-2-[2'-methylpropene-(1')-yl]-6-[2'-methylpropene-(2')-yl]-tetrahydropyran:

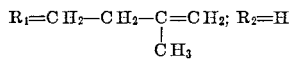

SCHEME B

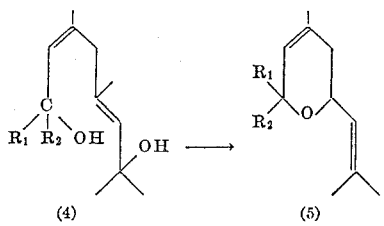

For example:
(a) 2,6-dimethyl-3,6-octadiene-2,8-diol

(a) 4-methyl-2-[2'-methylpropene-(1')-yl]-Δ⁴-dihydropyran: $R_1+R_2=H$
(b) 2,6,8-trimethyl-3,6-nonadiene-2,8-diol

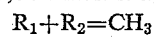

(b) 4,6,6-trimethyl-2-[2'-methylpropene-(1')-yl]-Δ⁴-dihydropyran: $R_1+R_2=CH_3$

SCHEME C

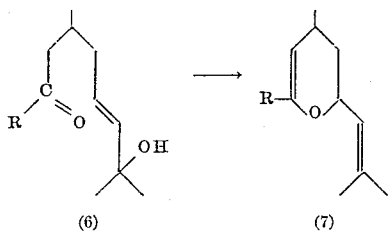

For example:
(a) 2,6,-dimethyl-3-octene-8-al-2-ol $R=H$ (a) 4-methyl-2-[2'-methylpropene-(1')-yl]-Δ⁵-dihydropyran: $R=H$
(b) 2,6-dimethyl-3-nonene-8-one-2-ol $R=-CH_3$ (b) 4,6-dimethyl-2-[2'-methylpropene-(1')-yl]-Δ⁵-dihydropyran: $R=-CH_3$
(c) 2,6-dimethyl-3,9-decadiene-8-one-2-ol $R=-CH=CH_2$ (c) 4-methyl-6-vinyl-2-[2'-methylpropene-(1')-yl]-Δ⁵-dihydropyran: $R=-CH=CH_2$

SCHEME D

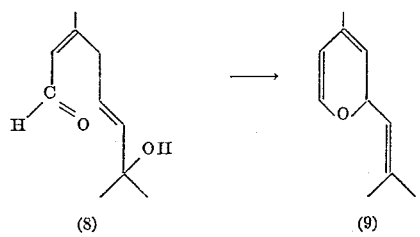

For example:
2,6-dimethyl-3,6-octadiene-8-al-2-ol $R=H$ 4-methyl-2-[2'-methylpropene-(1')-yl]-Δ³,⁵-pyran

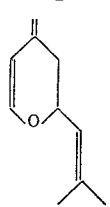

(10)

4-methylene-2-[2'-methylpropene-(1')-yl]-Δ⁵-dihydropyran

SCHEME E

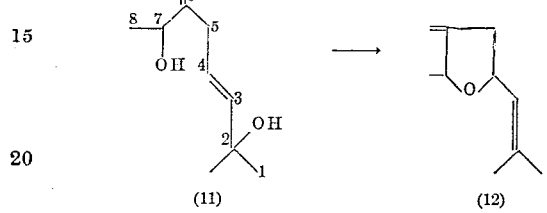

(11)  (12)

For example:
2-methyl-6-methylene-3-octene-2,7-diol 2-methyl-3-methylene-4-[2'-methylpropene-(1')-yl]-tetrahydrofuran In order that the invention may be more fully understood the following examples are given by way of illustration only (where appropriate the reactants and products are identified with reference to the above reaction schemes).

Example 1

200 g. of a crude mixture of hydroxyhydroperoxides, as directly obtained in the photo-sensitized autoxidation of β-citronellol are treated with a brisk current of steam and the oil passing over is collected in a receiver. After half an hour, the steam distillation is complete. Gas chromatography shows that the 48.4 g. of isolated oil consists of 90% of a mixture of the two diastereomeric oxides 2a and 3a.

Yield: 25% of the theory. Constants: $n_D^{20}$ 1.4566; $d_4^{20}$ 0.876; $a_D^{20}$ —33.5°.

Example 2

200 g. of glycol 1a are heated in a reaction vessel having a packed column mounted thereon at a bath temperature of 150° C. under a vacuum of 1 mm. A continuous splitting-off of water is observed, with distillation of the mixture of oxides 2a and 3a at 74° C. After 2 hours, the distillation is complete. 171.8 g. are obtained, which corresponds to a theoretical yield of 96% of 2a and 3a. The oxide has the following constants:

$n_D^{20}$ 1.4562; $d_4^{20}$ 0.8757; $a_D^{20}$ +27.5°

Starting with a laevorotatory glycol, the oxide mixture having the following constants is obtained;

$n_D^{20}$ 1.4566; $d_4^{20}$ 0.8761; $a_D^{20}$ —45.3°

Gas chromatography shows that the oxide separated from the water consisted of 99% of substantially equal parts of 2a and 3a.

Example 3

200 g. of glycol 1a are dropped into a flask heated at 200–250° C. The water spontaneously split off distils together with the oxide mixture formed into a well-cooled receiver. There are thus obtained 175.4 g. of oxide mixture, i.e. 98% of the theoretical yield. The oxide mixture 2a and 3a thus obtained has the following constants:

$n_D^{20}$ 1.4563; $d_4^{20}$ 0.8759; $a_D^{20}$ +36.8°

Example 4

200 cc. of a 3% aqueous sulphuric acid solution are added with ice cooling to 200 g. of glycol 1a, the odor of the oxide mixture immediately occurring. After stirring or shaking for half an hour, the reaction mixture is taken up in petroleum ether and washed with water and the solvent is separated from the oxide by distillation. The working up may be simplified by passing a current of steam through the reaction mixture. The oxide mixture driven over is collected in a receiver and separated from the water. In both cases, 165 g. of oxide mixture 2a and 3a are obtained. Yield: 92% of the theory. The oxide mixture thus obtained has the following constants:

$n_D^{20}$ 1.4561; $d_4^{20}$ 0.8758; $a_D^{20}$ −40.3°

Gas chromatography shows that it is a 97.5% pure mixture of oxides 2a and 3a.

*Example 5*

100 cc. of a saturated aqueous oxalic acid solution are added to 200 g. of glycol 1a, the reaction mixture being simultaneously treated with steam. There are collected in a receiver 170 g. of an oil which, as shown by gas chromatography, consists of a 99% pure mixture of oxides 2a and 3a. Yield: 95% of the theory.

Constants of the oxide mixture thus obtained:

$n_D^{20}$ 1.4566; $d_4^{20}$ 0.8760; $a_D^{20}$ +36.5°

*Example 6*

231 g. of a glycol mixture obtained by $Na_2SO_3$ reduction of photo-oxidation products of citronellol, which mixture contains 60% of glycol 1a, is heated in accordance with Example 1 on a packed column at a bath temperature of 150° C. and under a vacuum of 1 mm. As indicated in Example 1, water is immediately split off, with distillation of the mixture of oxides 2a and 3a. There are obtained 110 g.=90% of the theory, of pure oxide mixture. The flask residue consists of 93.6 of pure 2,6-dimethyl-4,8-dihydroxyoct-1-ene and has the following constants:

$n_D^{20}$ 1.4751; $d_4^{20}$ 0.9521; $a_D^{20}$ +2.95°. B.P.$_{0.03}$ 96–97°

The oxide mixture has the following constants:

$n_D^{20}$ 1.4564; $d_4^{20}$ 0.8762; $a_D^{20}$ +27.5°

*Example 7*

250 g. of a glycol mixture obtained by $Na_2SO_3$ reduction of photo-oxidation products of citronellol were treated with steam in the presence of 100 cc. of a saturated aqueous oxalic acid solution. There were thus collected in a receiver 123 g. of a pure mixture of oxides 2a and 3a. Yield: 92% of the theory.

Constants of the oxide mixture:

$n_D^{20}$ 1.4561; $d_4^{20}$ 0.8760; $a_D^{20}$ −38.5°

The same result is obtained with a yield of over 90% of oxide mixture when employing glycol mixtures obtained by reduction of the photo-oxidation products of acetoxycitronellol, citronellal and citronellic acid or their esters, for example by $LiAlH_4$.

*Example 8*

231 g. of a glycol mixture obtained by $Na_2SO_3$ reduction of photo-oxidation products of (+)-2,6-dimethyl-non-2-en-8-ol were heated on a packed column in the presence of 0.2 g. of toluene-p-sulphonic acid at a bath temperature of 150° C. and under a vacuum of 11 mm. Hg. Water was immediately split off with distillation of the mixture of oxides 2b and 3b. Yield: 118 g.=94.5% of the theory. The mixture of oxides 2b and 3b had the following constants:

$n_D^{20}$ 1.4531; $d_4^{20}$ 0.8639; $a_D^{20}$ +26.41°, B.P.$_{10}$ 78–80°C.

*Example 9*

92 g. of a glycol mixture obtained by $Na_2SO_3$ reduction of the photo-oxidation products of (+)-2,6-dimethyl-dec-2-en-8-ol were treated exactly as described in Example 8. In this way, 45 g.=90% of the theory of a corresponding mixture of oxides were obtained.

Constants: $n_D^{20}$ 1.4572; $d_4^{20}$ 0.8699; $a_D^{20}$ +13.26°; B.P.$_{10}$ 88–90°.

*Example 10*

250 g. of a glycol mixture obtained by $Na_2SO_3$ reduction of the photo-oxidation products of (+)-2,6,8-trimethylnon-2-en-8-ol were treated at a bath temperature of 160° C. in the presence of 0.2 g. of toluene-p-sulphonic acid exactly as described in Examples 8 and 9. After the usual working up, there were obtained 135 g.=99% of the theory of the corresponding oxides.

Constants: $n_D^{20}$ 1.4599; $d_4^{20}$ 0.8711; $a_D^{20}$ −5.77°; B.P.$_8$ 87.5°.

*Example 11*

130 g. of a glycol mixture obtained by $Na_2SO_3$ reduction of photo-oxidation products of (+)-2,6,8-trimethyl-dec-2-en-8-ol were treated in the presence of 0.2 g. of toluene-p-sulphonic acid at 160° C. exactly as in the preceding examples. After the usual working up of the reaction products, there were obtained 65.6 g.=98% of the theory of pure oxide.

Constants: $n_D^{20}$ 1.4606; $d_4^{20}$ 0.8701; $a_D^{20}$ −3.9°; B.P.$_{11}$ 110°.

*Example 12*

200 g. of glycol 4a are heated in a flask having a packed column mounted thereon, at a bath temperature above 100° C. and with an addition of 0.1 g. of toluene-p-sulphonic acid under a vacuum of 1 mm. The water continuously split off is collected in a trap cooled with Dry Ice, and the oxide 5a boiling at 80° C. is distilled into the receiver. After distillation for two hours, 171 g. of distillate are obtained, which distillate is shown by gas chromatography to consist of 99% of pure 5a.

Yield: 96% of the theory. Constants: $n_D^{20}$ 1.4746; $d_4^{20}$ 0.9340; $a_D^{20}$ ±0°.

*Example 13*

To 200 g. of glycol 4a are added 200 cc. of a 3% aqueous sulphuric acid solution with ice cooling, and after stirring for half an hour the mixture is taken up in petroleum ether and washed with water, and the solvent is separated from the reaction mixture by distillation. The working-up may be simplified by passing a current of steam through the reaction mixture. The oxide driven over is collected in a receiver and separated from the water. In both cases, 166.5 g. of oxide 5a are obtained.

Yield: 93% of the theory. Constants: $n_D^{20}$ 1.4749; $d_4^{20}$ 0.9343; $a_D^{20}$ ±0°.

*Example 14*

200 g. of glycol 4a are mixed with 100 cc. of a saturated aqueous oxalic acid solution and simultaneously treated with steam. The oil passing over is collected in a receiver, which oil is shown by gas chromatography to consist of 99% pure oxide .5.

Yield: 169.6 g.=95% of the theory. Constants: $n_D^{20}$ 1.4744; $d_4^{20}$ 0.9338.

*Example 15*

250 g. of a glycol mixture obtained by $Na_2SO_3$ reduction of the photo-oxidation products of nerol and containing 60% of glycol 4 are treated in accordance with Example 14 with steam in the presence of 100 cc. of a saturated aqueous oxalic acid solution. 121 g. of pure oxide 5a are thus directly collected in the receiver.

Yield: 90% of the theory. Constants: $n_D^{20}$ 1.4747; $d_4^{20}$ 0.9342.

The flask residue consists of substantially pure (93 g.) 2,6-dimethyl-4,8-dihydroxyocta-1,6-diene.

Constants of the glycol: $n_D^{20}$ 1.4912; $d_4^{20}$ 0.9791; $a_D^{20}$ ±0°; B.P.$_{0.03}$ 118°.

Example 16

25 g. of a mixture of the two hydroxyaldehydes 2,6-dimethyl-1-oct-8-enal-3-ol (40%) and 2,6-dimethyl-3-oct-8-enal-2-ol (60%) are heated in a flask having a packed column mounted thereon at a bath temperature above 100° C. and with an addition of 0.1 g. of toluene-p-sulphonic acid in a vacuum of 1 mm. The water continuously split off is collected in a trap cooled by Dry Ice, and the oxide is distilled into the receiver.

Yield: 11.6 g.=95% of the theory. Constants: B.P.$_{14\ mm.}$ 75° C.; $n_D^{20}$ 1.4660; $d_4^{20}$ 0.9868; $a_D^{20}$ =+ or −102°.

Gas chromatography shows that it is a 99% pure and sterically uniform compound.

Example 17

25 g. of hydroxyaldehyde mixture, which again consists of 60% of 2,6-dimethyl-3-oct-8-enal-2-ol, were heated in the presence of 1 g. of oxalic acid as indicated in Example 16. There were thus obtained 11.9 g. =97.5% of the theory of cyclization product.

Constants: $n_D^{20}$ 1.4658; $d_4^{20}$ 0.8963; $a_D^{20}$=+50°.

Gas chromatography shows that it is a mixture of the two stereoisomeric 4-methyl-2-[2'-methylpropen-(1')-yl]-Δ⁵-dihydropyrans.

We claim:
1. 4-methyl-6-vinyl-2-[2'-methylpropene-(1')-yl]-tetrahydropyran.
2. 4-methyl-2-[2'-methylpropene-(1')-yl]-6-[2'-methylpropene-(2')-yl]-tetrahydropyran.
3. 4,6,6-trimethyl-2-[2'-methylpropene-(1')-yl]-Δ⁴-dihydropyran.
4. 4-methyl-2-[2'-methylpropene-(1')-yl]-Δ⁵-dihydropyran.
5. 4,6-dimethyl-2-[2'-methylpropene-(1')-yl]-Δ⁵-dihydropyran.
6. 4-methyl-6-vinyl-2-[2'-methylpropene-(1')-yl]-Δ⁵-dihydropyran.
7. 4-methyl-2-[2'-methylpropene-(1')-yl]-Δ³,⁵-pyran.
8. 4-methylene-2-[2'-methylpropene-(1') - yl]-Δ⁵-dihydropyran.
9. 2-methyl-3-methylene-5-]2'-methylpropene-(1')-yl]-tetrahydrofuran.

References Cited by the Examiner

Naves et al.: Helvetica Chimica Acta, vol. 44, pp. 1867–1872 (1961).

Naves et al.: Societe Chimique de France, sec. 5, pp. 645–647 (1961).

Ohloff et al.: Angewandte Chemie, vol. 73, page 578 (1961).

Seidel et al.: Helvetica Chimica Acta, vol. 42, pp. 1830–1844 (1959).

Seidel et al.: Helvetica Chimica Acta, vol. 44, pp. 598–606.

WALTER A. MODANCE, *Primary Examiner.*

NICHOLAS S. RIZZO, *Examiner.*

NORMAN H. STEPNO, NORMA S. MILESTONE,
*Assistant Examiners.*